No. 815,894. PATENTED MAR. 20, 1906.
J. C. & F. G. AGEY.
HARROW.
APPLICATION FILED NOV. 27, 1905.
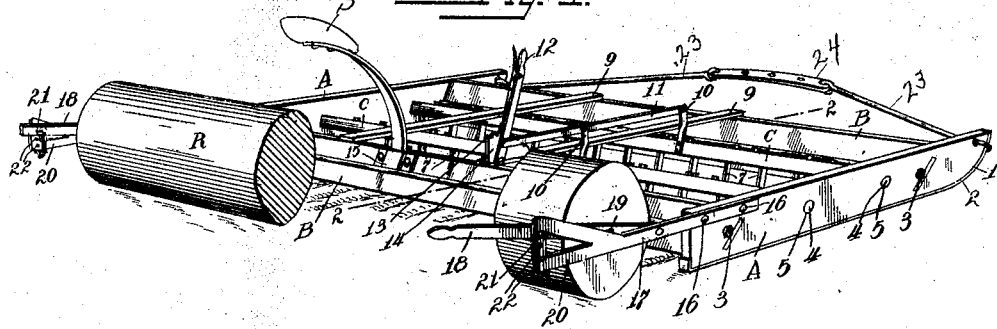
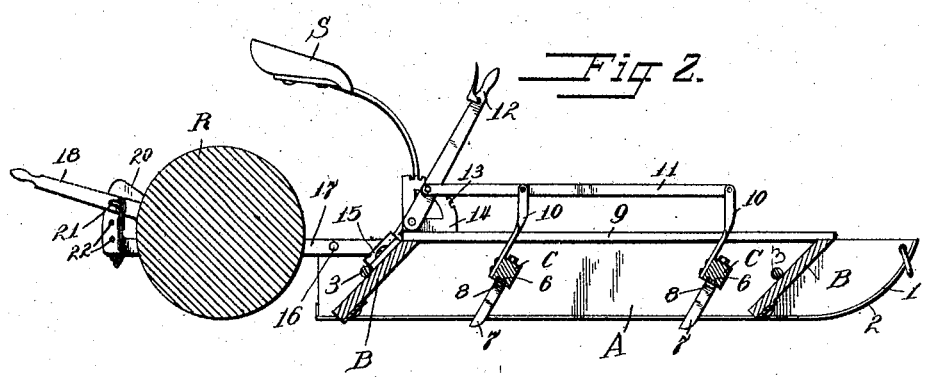
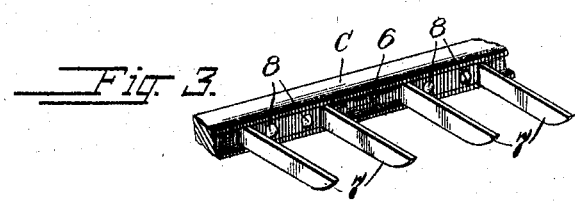
Witnesses
Milton Lenour
Watts T. Estabrook
Inventors
Joseph C. Agey
Frank G. Agey
by their Attorneys

UNITED STATES PATENT OFFICE.

JOSEPH C. AGEY AND FRANK G. AGEY, OF INDIANA, PENNSYLVANIA.

HARROW.

No. 815,894.  Specification of Letters Patent.  Patented March 20, 1906.

Application filed November 27, 1905. Serial No. 289,305.

*To all whom it may concern:*

Be it known that we, JOSEPH C. AGEY and FRANK G. AGEY, citizens of the United States, residing at Indiana, in the county of Indiana and State of Pennsylvania, have invented certain new and useful Improvements in Harrows, of which the following is a specification.

Our invention relates to an improvement in harrows; and the object of our invention is to provide a harrow which will break up the soil and roll the same all at one operation instead of first dragging and then rolling.

Our invention relates to certain other novel features of construction and combinations of parts, which will be hereinafter described, and pointed out in the specification.

In the accompanying drawings, Figure 1 is a rear perspective view of our invention. Fig. 2 is a cross-sectional view on the line 2 2 of Fig. 1, and Fig. 3 is a detail view of the teeth and cross-bars.

A A represent the side pieces or runners, which are slightly rounded at their forward ends, as at 1, and iron plates or shoes 2 are placed on the lower side of the runners to form a wearing-surface.

B B are the cross-pieces, which are mortised into the runners A at an angle of about forty-five degrees, and to securely hold these parts together rods 3 3 extend across from runner to runner in the rear of the cross-pieces. Between the cross-pieces are cross-bars C C. The cross-bars preferably are provided on their outer ends with journals 4, which fit in openings 5 in the runners A, thereby securely holding them in place and at the same time allowing free movement. Grooves 6 are formed in the cross-bars to receive the preferably U-shaped teeth 7, which are secured to the cross-bar by means of bolts 8, which teeth are preferably arranged so that the teeth on the rear cross-bar travel midway between the cuts made by the teeth on the front cross-bar. Bars 9 9 are secured to the cross-pieces B in any suitable manner for strengthening the cross-pieces. Connected to the cross-bars C are L-shaped links 10 10, which are twisted at their center and are secured at their other ends to a connecting-rod 11, which is connected to a ratchet-lever 12. The ratchet-lever engaging the teeth 13 on rack-bar 14, secured to one of the bars 9, regulates the position of the teeth 7, which can be raised out of their normal lowered position, whereby the harrow can be used for hauling stone or the like by placing a platform on the bars 9. In the rear cross-piece B is a casting 15 to receive a spring-seat S, which is held in the casting by any suitable means. Secured to the rear of the runners by means of bolts 16 are arms 17 17, which terminate at their outer ends in the form of a quadrant 20. Levers 18 are secured to the arms, and a roller R is journaled to the levers at 19. The roller can be raised or lowered, as desired, by adjusting the height of the levers on the quadrant 20 by means of the pin 21, which registers with the openings 22 in the quadrant. At the forward end of the runners rods or chains 23 are secured, and at their ends an adjustable draft-bar 24 is connected. The object of this draft-bar is to provide means for regulating the draft of the equalizers (not shown) in case the harrow is being used on the side of a hill, for instance.

It will be seen from the foregoing that we have provided a harrow which will break the soil and roll it at the same time. As the harrow is drawn forward the cross-pieces B will tend to break up the soil, and the teeth 7 will cut the soil up and then the roller will smooth it out. The teeth 7 are made from spring-steel and made in pairs—that is, in one piece—to form two teeth, which enables them to be more securely fastened to the cross-bars.

It is evident that slight changes might be made in the form and arrangement of the several parts described without departing from the spirit and scope of our invention, and hence we do not wish to limit ourselves to the exact construction herein set forth; but, Having fully described our invention, what we claim as new, and desire to secure by Letters Patent, is—

1. A harrow comprising runners and cross-pieces, cross-bars journaled in the runners, teeth secured to the cross-bars, means connecting the cross-bars to adjust them to any position, arms secured to the runners, levers connected to the arms, a roller journaled to the levers, and means for regulating the adjustment of the roller.

2. A harrow comprising runners and cross-pieces, cross-bars journaled in the runners, teeth secured to the cross-bars, means connecting the cross-bars to adjust them to any position, arms secured to the runners, levers connected to the arms, a roller journaled to the levers, means for regulating the adjustment of the roller, a draft-bar, and means connected with the draft-bar for connecting it to the harrow.

In testimony whereof we affix our signatures in presence of two witnesses.

JOSEPH C. AGEY.
FRANK G. AGEY.

Witnesses:
S. J. McMANIS,
J. E. FULTON.